United States Patent
Morin et al.

(10) Patent No.: US 12,182,334 B2
(45) Date of Patent: Dec. 31, 2024

(54) GESTURE-BASED USER INTERFACE DEVICE AND METHOD

(71) Applicant: INTERDIGITAL MADISON PATENT HOLDINGS, SAS, Paris (FR)

(72) Inventors: Thomas Morin, Saint-Gregoire (FR); Serge Defrance, Rennes (FR); Hassane Guermoud, Thorigne Fouillard (FR); Sylvain Lelievre, Montgermont (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 80 days.

(21) Appl. No.: 18/011,954

(22) PCT Filed: Jun. 22, 2021

(86) PCT No.: PCT/EP2021/066963
§ 371 (c)(1),
(2) Date: Dec. 21, 2022

(87) PCT Pub. No.: WO2021/259916
PCT Pub. Date: Dec. 30, 2021

(65) Prior Publication Data
US 2023/0168746 A1    Jun. 1, 2023

(30) Foreign Application Priority Data

Jun. 26, 2020 (EP) ..................... 20305710

(51) Int. Cl.
*G06V 40/20* (2022.01)
*G06F 3/01* (2006.01)

(52) U.S. Cl.
CPC .............. *G06F 3/017* (2013.01); *G06V 40/28* (2022.01)

(58) Field of Classification Search
None
See application file for complete search history.

(56) References Cited

U.S. PATENT DOCUMENTS

| | | | |
|---|---|---|---|
| 2005/0134117 A1* | 6/2005 | Ito | G06F 3/017 307/10.1 |
| 2010/0306261 A1* | 12/2010 | Geisner | G06F 3/011 715/863 |
| 2011/0199291 A1* | 8/2011 | Tossell | G06V 40/23 600/595 |
| 2016/0334877 A1* | 11/2016 | Yousefi | G06V 10/46 |
| 2017/0147075 A1* | 5/2017 | Lerner | G06F 3/017 |
| 2017/0193289 A1 | 7/2017 | Karmon et al. | |

FOREIGN PATENT DOCUMENTS

WO   WO 2021180883 A1   9/2021

* cited by examiner

*Primary Examiner* — Rinna Yi
(74) *Attorney, Agent, or Firm* — VOLPE KOENIG (57) ABSTRACT

A user interface device including memory configured to store instructions and at least one hardware processor configured to execute the instructions to obtain, from at least one sensor, sensor data corresponding to a user gesture, determine a user interface gesture that matches the sensor data, obtain parameters for the determined interface gesture, and upon obtaining the parameters for the determined interface gesture, use the sensor data and the parameters for the determined interface gesture to estimate the user gesture in a user interface. Also provided is a method.

11 Claims, 4 Drawing Sheets

GESTURE-BASED USER INTERFACE DEVICE AND METHOD

CROSS REFERENCE TO RELATED APPLICATIONS

This application is a U.S. National Stage Application under 35 U.S.C. 371 of International Patent Application No. PCT/EP2021/066963, filed Jun. 22, 2021, which is incorporated herein by reference in its entirety.

This application claims the benefit of European Patent Application No. 20305710.4, filed Jun. 26, 2020.

TECHNICAL FIELD

The present disclosure relates generally to user interfaces and in particular to detection of user gestures in user interfaces.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A Graphical User Interface (GUI) is a well-known way for a user to interact with a digital display, e.g. a television, a monitor, a smartphone, a tablet and a Head-Mounted Display (HMD).

While it is common for a user to interact with the GUI through direct action using for example a mouse, a joystick or by physical touch, it is also possible for the GUI system to detect the user's gestures and interpret these as GUI actions such as 'activate', 'select' and 'move' to name but a few.

In the latter case, the system requires one or more sensors that detect the user's body parts, such as one or both hands. Typically, both the position and the posture are detected, e.g. where the hand is located and how it is shaped (fingers extended or not, etc.). The system can then build a virtual structure of the body part(s) and coordinates of this virtual structure can be used to compute the interactions with the GUI environment.

At present, the most well-known sensor for hand posture and position is the LeapMotion device, which can be installed on a desktop, attached to a human chest, or incorporated in devices such as HMDs.

Using such a GUI system with display and sensor, the user can then move the body part, which is detected by the sensor and interpreted to interact with virtual objects rendered on the display.

However, in certain cases, for example when a body part is far from the sensor or when a body part cannot be fully detected, noise is introduced into the coordinates of the computed virtual structure (e.g. a skeleton). The noise, which can also be a result of shaking of the body part, can cause an erroneous interpretation of the body part, for example causing erroneous or physically impossible body part coordinates (e.g. a 'broken' finger) or the absence of coordinates.

If the user wants to interact with a virtual object (e.g. a button), incorrect coordinates may prevent the interaction.

It will thus be appreciated that there is a desire for a solution that addresses at least some of the shortcomings of GUIs with sensors that detect body parts. The present principles provide such a solution.

SUMMARY OF DISCLOSURE

In a first aspect, the present principles are directed to a device including memory configured to store instructions, executable by a processor, and to store parameters, and at least one hardware processor configured to execute the instructions to obtain, from at least one sensor, sensor data corresponding to a user gesture, determine a user interface gesture that matches the sensor data, obtain parameters for the determined interface gesture, and upon obtaining the parameters for the determined interface gesture, use the sensor data and the parameters for the determined interface gesture to estimate the user gesture in a user interface.

In a second aspect, the present principles are directed to a method including, in at least one hardware processor of a device, obtaining, from at least one sensor, sensor data corresponding to a user gesture, determining a user interface gesture that matches the sensor data, obtaining parameters for the determined interface gesture, and upon obtaining the parameters for the determined interface gesture, using the sensor data and the parameters for the determined interface gesture to estimate the user gesture in a user interface.

In a third aspect, the present principles are directed to a computer program product which is stored on a non-transitory computer readable medium and includes program code instructions executable by a processor for implementing the steps of a method according to any embodiment of the second aspect.

BRIEF DESCRIPTION OF DRAWINGS

Features of the present principles will now be described, by way of non-limiting example, with reference to the accompanying drawings, in which.

DESCRIPTION OF EMBODIMENTS

In the following description, the following expressions will be used:
User gesture: the position, possibly including movement, of the user's body or body part, for example arms held horizontally with vertical trunk and legs, "thumbs up", closed first with index extended.
Sensor data: data (e.g. node coordinates) output by the at least one sensor, typically representative of a user gesture.
GUI gesture: a subset of all possible user gestures that can be interpreted by the GUI as a (possible) interaction with the GUI. For example, thumbs up may not be a GUI gesture while the closed first with extended index is.
Default parameters: the 'standard' parameters of GUI gestures that will be used to interpret user gestures.

Learnt parameters: GUI gesture parameters measured from a detected user gesture.

Figure 1:
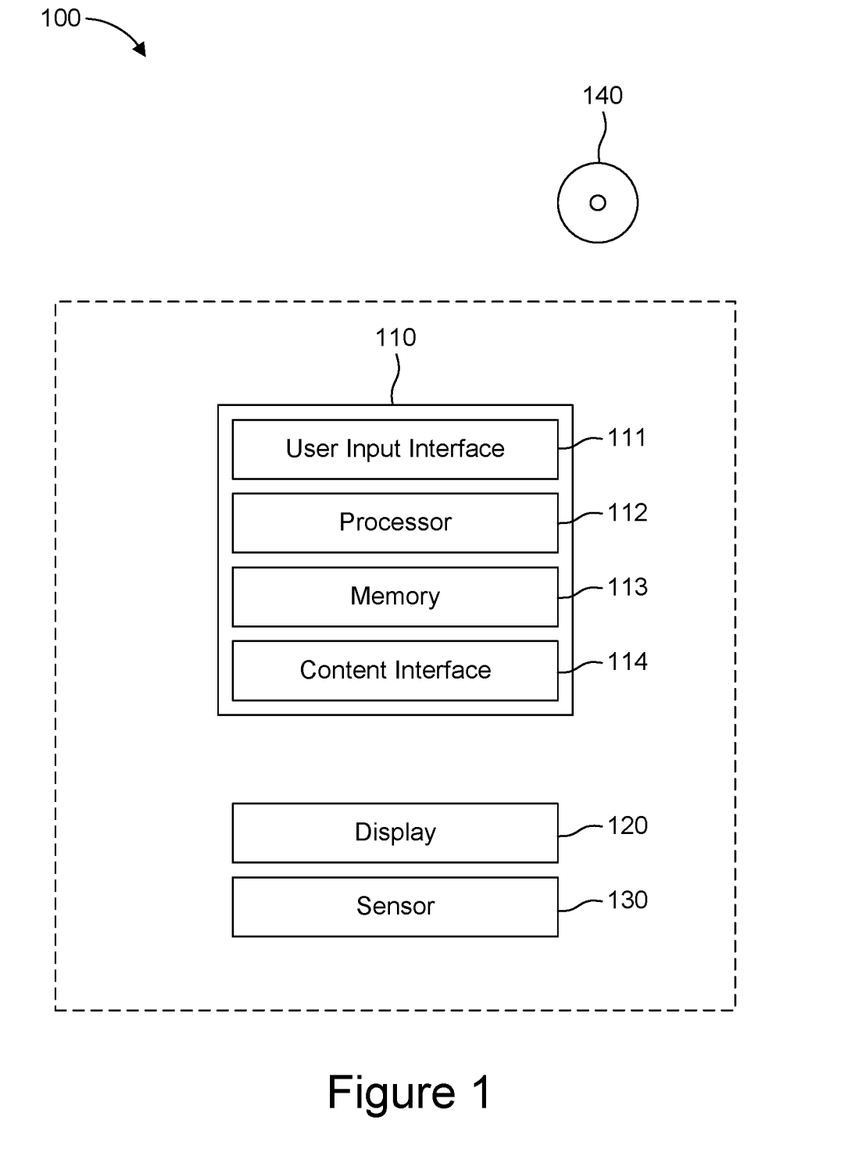
FIG. 1 illustrates a GUI system according to an embodiment of the present principles.

FIG. 1 illustrates a Graphical User Interface (GUI) system 100 according to an embodiment of the present principles. The GUI system 100 includes a processing device 110, a display 120 and at least one sensor 130.

The processing device 110, the display 120 and the at least one sensor 130 can be separate, functionally connected, devices. For example, the processing device 110 can be a computer, a decoder or a set-top box receiving input from one or more standalone sensors 130 and providing output to the display 120, for example a television set.

In embodiments, various combinations are also contemplated, such as for example a separate processing device 110 and combined display 120 and at least one sensor 130, or a combined processing device 110 and display 120 (for example in a television set) connected to at least one separate sensor 130. In a particular embodiment, the processing device 110, the display 120 and the at least one sensor 130 are incorporated in a single device, such as a television set or a head-mounted device (HMD). It should be understood that when the at least one sensor 130 is co-located with at least one other part, the system may still include additional separate sensors.

The processing device 110 typically includes at least one user interface 111, at least one hardware processor ("processor") 112, memory 113, and a communication interface 114.

The user interface 111 is configured to receive input from a user. The user interface 111 can include one or more buttons (physical or virtual) or a receiver of signals from a user interface unit, such as a conventional remote control.

The processor 112 is configured to execute program code instructions to perform a method according to the present principles.

The memory 113, which can be at least partly non-transitory, is configured to store the program code instructions to be executed by the processor 112, parameters, image data, intermediate results and so on.

The communication interface 114 is configured for communication with external devices, for example to receive content and other information for display on the display 120. The communication interface can implement any suitable technology, wired or wireless or a combination of the two.

The display 120 is configured to display on its screen images provided by the processing device, as is known in the art.

The at least one sensor 130 is configured to detect user gestures and provide sensor data to the processing device 110. As mentioned, the at least one sensor can be separate from the display 120, but it can also be integrated in one or more parts of it, such as for example its stand, its frame or even inside its screen.

The at least one sensor 130 can for example be based on Leap Motion technology. In an embodiment, the at least one sensor 130 is configured to detect user gestures in front of the display 120. It is noted that a plurality of sensors can be needed.

A non-transitory storage medium 140 stores computer-readable instructions that, when executed by at least one processor, perform at least one method of the present principles, such as the methods described with reference to FIG. 2 and FIG. 3.

In a non-limitative example used in the greater part of this description, the body part is a hand, but as will be described, the present principles readily extend to other body parts.

As will be appreciated, the virtual structure of the body part(s) is generally made up of nodes, e.g. corresponding to joints or endpoints. The nodes can be ranked in terms of coordinate stability and/or reliability. For example, the position of the palm is typically more stable and accurate than the positions of the fingertips. This can make it possible to estimate the position of a fingertip based on the position of the palm in case the coordinates of the fingertip are subject to noise and deemed unreliable. The accuracy of the estimate can be increased in case the system has previously learnt—preferably subject to little or no noise—the learnt parameters corresponding to the present user gesture.

As an example, a GUI environment can propose buttons with which the user can interact, typically using the tip of the index finger. When the hand is near the sensor, the posture and in particular the position of the index fingertip node relative to, for example, the node of the palm or the proximal interphalangeal joint of the index can be learnt. At a later point, when the hand gets close to a (virtual) button, the system can verify if the coordinates of the fingertip node are reliable. The reliability verification can for example be based on a predefined distance threshold from the sensor or on a noise analysis on hand nodes coordinates. If the coordinates (and hence the fingertip position) are deemed to be unreliable, then the system can replace the detected fingertip position by a fingertip position extrapolated from the learnt parameters for the corresponding GUI gesture and the detected position of the generally more accurately detected node (e.g. corresponding to the palm or the proximal interphalangeal joint of the index).

It is noted that a number of arbitrary choices were made in the previous example. For instance, palm or proximal interphalangeal coordinates are considered as stable and the user only interacts with the tip of the extended index finger of the and with a palm with a unique orientation. It should however be appreciated that there are existing UI systems that are based on these assumptions.

It is also noted that the present principles readily extend to covers more complex models with, for example, one or more of:
- a plurality of body parts able to control the GUI;
- free orientation of body parts;
- free orientation of virtual objects, which for instance means that the objects may be interacted with differently depending on the orientation;
- a plurality of postures, even for a single body part, for interaction with a virtual object;
- dynamic management of stable nodes, meaning that nodes considered stable may depend on the context.

The present principles can rely on two main parts: one for learning parameters from a detected user gesture to obtain learnt parameters, and one for GUI object manipulation in which unreliable detected sensor data are replaced or corrected.

A GUI system can use several GUI gestures, for example open hand, closed hand, and closed hand with only index finger extended. Moreover, an interactive GUI object may be interacted with using different user gestures; a button can for example be activated with using the index finger or the open hand palm.

Learning Parameters

It is first noted that parameters for user gestures that tend to be correctly detected at least most of the time may not need to be learnt. An example of such a gesture is an open hand with fingers together.

It is also noted that while transparent learning can be preferred, the GUI system can also propose a calibration procedure during which the user is requested to make the gestures to be learnt.

Using transparent learning, parameters can be learnt through either or both of the following situations.

The GUI system detects a user posture in a location where the system has high confidence in the accuracy of the captured sensor data. Example: the user's hand interacts with a button when the hand is relatively close to a sensor. The GUI system can then learn parameters of the user gesture that the user chose to interact with the button. The GUI system can then estimate that the user uses the same user gesture when interacting with a button (or similar object) relatively further away from the sensor. In a sense, the GUI system learns a new GUI gesture this way.

The GUI system can also learn specific parameters for existing GUI gestures for interaction with the GUI system, in particular objects (e.g. buttons). Learning includes obtaining user-specific sensor data and using these data to obtain learnt parameters for the GUI gesture, as will be further described. Example: the GUI system only allows interaction with touch buttons with an extended index finger, in which case learning can include measuring distances and angles between specific hand nodes to provide new GUI gesture parameters or to refine existing learnt parameters.

Figure 2:
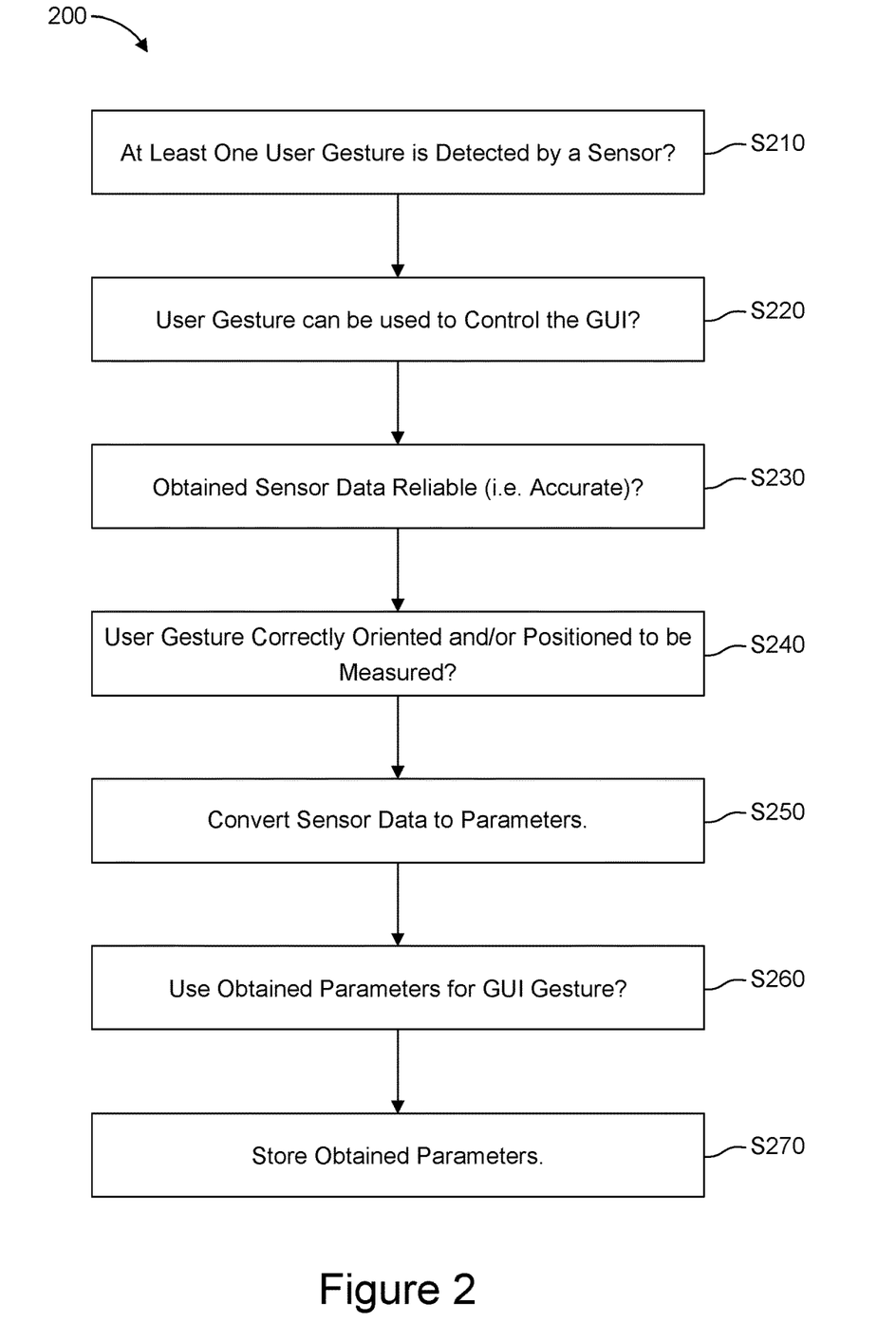
FIG. 2 illustrates a method for learning model postures according to an embodiment of the present principles.

FIG. 2 illustrates a method 200 for learning parameters according to an embodiment of the present principles. The method can be performed by the processor (112 in FIG. 1) of the processing device (110 in FIG. 1) using input from a sensor (130 in FIG. 1), although it will be appreciated that the input can be provided by a plurality of sensors.

In the described method, the method proceeds to the next step in case of a positive determination; otherwise the method returns to the first step.

In step S210, it is determined if at least one user gesture is detected by a sensor.

In step S220, it is determined if the user gesture can be used to control the GUI, for example by determining if the user gesture corresponds to a GUI gesture (e.g. using a similarity score). It is also possible to determine that the user interacts with a GUI object, as already described.

In step S230, it is determined whether the obtained sensor data (e.g. node coordinates) of the user gesture are evaluated to be accurate. This can for example be done based on one or both of the distance from the sensor (e.g. if the gesture is detected in a volume in which detection typically is accurate, such as neither too close nor too far away) and body part coordinate stability detection, for example based on coordinate noise levels as is known.

In step S240, it is determined if the user gesture corresponds to a GUI gesture and if it is correctly oriented and/or positioned to be measured.

In step S250, the sensor data is converted to parameters (e.g. relative node coordinates) for the GUI gesture, as is well known in the art.

In step S260, it is determined whether the obtained parameters should be taken into account for the GUI gesture. This can, for example, be done if the GUI gesture has no associated default parameters or learnt parameters, if the obtained parameters are better (i.e. are more reliable, which for example may be the case if the user gesture was detected in a place where the sensor is more precise) than the currently learnt parameters for the GUI gesture, or if the determined posture pattern parameters can be used to enrich (i.e. improve) the current learnt parameters—the condition or conditions that determines this can depend on the implentation.

In step S270, the obtained parameters are stored (as default or learnt parameters, depending on the case) or used to enrich the learnt parameters.

It is noted that the GUI system may have several users. In this case, it may be necessary to determine which user is currently interacting with the system. This can for example be done by measuring particular aspects of the current user's body, e.g. the distance between the palm node and the elbow node. It is noted that it may not be necessary to differentiate between two users of at least roughly the same size. Furthermore, the GUI system can provide distinct learnt parameters in certain cases, for example if the GUI gesture is closed first with extended index finger and the user for some reason (e.g. not having an index finger) instead uses the middle finger.

It is also noted that the GUI system can include mirrored GUI gestures for example corresponding to the use of the left hand and the right hand.

Learnt parameters can for example include:
- a user identifier, e.g. one or more body measurements, as already described;
- a posture pattern similarity score, i.e. which GUI gesture does it resemble the most?
- one or more nodes to which the (adjusted) GUI gesture is to be attached, e.g. nodes of a hand can be attached to nodes of the wrist; and
- orientation of the GUI gesture.

Virtual Object Interaction

According to the present principles, an interactive object can be associated with a surrounding volume for detecting when a body part approaches the object (e.g. to detect a user gesture). Detection of an approaching body part can be by detection of the body part approaching the interactive object in the GUI (possibly in the real world) or detection of the corresponding virtual structure approaching the interactive object in the GUI virtual environment.

Further, an interactive object can be associated with one or more compatible GUI gestures, i.e. the gestures a user can use to interact with the interactive object.

Figure 3:
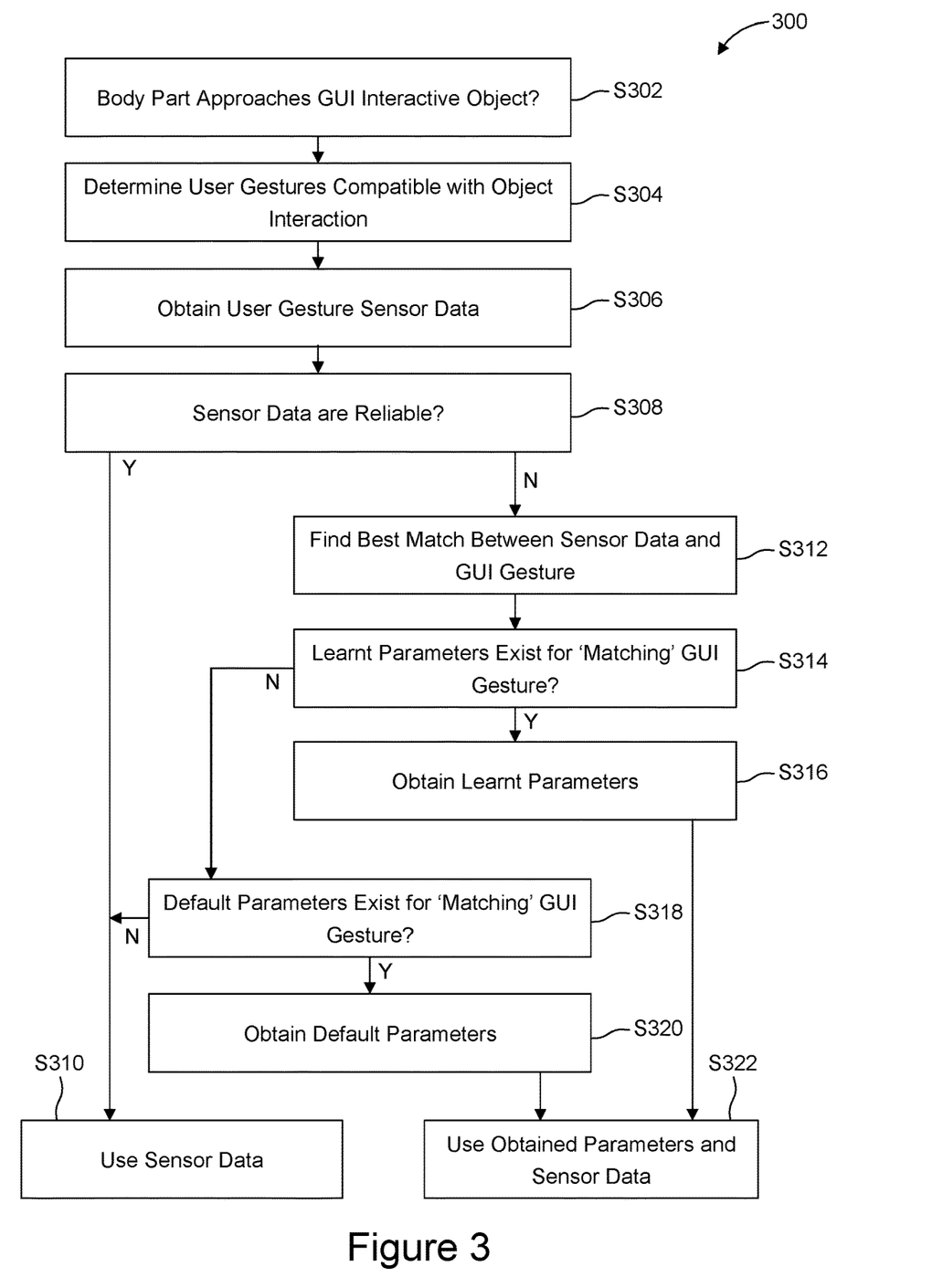
FIG. 3 illustrates a method for virtual object interaction according to an embodiment of the present principles.

FIG. 3 illustrates a method 300 for virtual object interaction according to an embodiment of the present principles. As for the method illustrated in FIG. 2, this method can be performed by the processor (112 in FIG. 1) of the processing device (110 in FIG. 1) using input from a sensor (130 in FIG. 1), although it will be appreciated that the input can be provided by a plurality of sensors.

As described with reference to FIG. 2, although not illustrated the method illustrated in FIG. 3 may include a detection of the present user. Such a detection may occur at practically any time during the execution of the method, e.g. in or after step S302 or after step S308.

In step S302, it is determined whether a body part approaches a GUI interactive object. This can be done by detecting if a body part is located within the volume associated with the object. Step S302 is iterated until a body part approaches an object, upon which the method proceeds to step S304. Put another way, in step S302 a user gesture can be detected.

In step S304, user gestures compatible with interaction with the object (approached by the body part) are determined.

In step S306, the sensor data corresponding the user gesture is obtained.

In step S308, it is determined whether the sensor data are reliable, i.e. if they are accurate, as already described.

It can be said that the sensor data are reliable if they are subject to little noise. This can for example be determined by determining if the sensor detects the gesture in a place where its readings have been determined to be reliable (such as neither too close nor too far away) or using a noise analysis algorithm, as is known.

In case the sensor data are determined to be reliable, the method proceeds with step S310, in which the sensor data are used by the GUI system. The use can for example be to determine interaction with an object and rendering of the user gesture on a display. The method can then end or return to step S302.

In case the sensor data are determined to be unreliable, the method continues in step S312, in which the sensor data (possibly processed to obtain corresponding parameters) are compared with the GUI gestures to find the one that best matches the sensor data. This can for example be done using a similarity score obtained using any suitable conventional method, such as a method that compares node distances and angles.

The comparison can include a temporal aspect, using also previously obtained parameters. For example, if a certain gesture was reliably detected from a given time until the present (at which the sensor data are no longer reliable), then this can be used as an indication that the previously detected gesture corresponds to the present gesture. As an example, a user who wants to push a button or interact with another object may adopt the proper user gesture before (or when) moving towards the button and maintain the gesture until the button has been clicked.

In step S314, it is determined if there are learnt parameters (possibly for the current user) for the 'matching' GUI gesture.

In case there are such learnt parameters, in step S316, these learnt parameters are obtained (e.g. from memory) and used, in step S322, together with reliable parts of the sensor data to estimate the user gesture and to determine its interaction with the GUI system. Such interaction can be interaction with a GUI object, representation of the user gesture in the GUI system, or both.

As already described, part of the sensor data can be reliable while other parts are not; e.g. the coordinates of the palm node may be reliable while the coordinates of the tip of the index finger are not. This may determined from the sensor data for example using, as already mentioned, noise analysis, but it may also be predetermined (e.g. palm coordinates are assumed to be reliable). The GUI system can then use the palm coordinates from the sensor data and the learnt parameters to extrapolate the coordinates of the tip of the index finger.

However, in case no such learnt parameters exist, in step S318, it is determined whether default parameters exist for the 'matching' GUI gesture. Indeed, it is possible for the GUI system to use only learnt parameters.

In case no default parameters exist, in step 318, the sensor data are used by the GUI system, as already described.

However, in case default parameters exist, in step S320, the default parameters are obtained (e.g. from memory) and used, in step S322, as already described.

In one embodiment, the GUI system provides GUI feedback (e.g. visual or audio feedback) when learnt parameters are used. As an example, when learnt parameters are used to interpret a user hand gesture, the GUI can render the hand in a particular colour.

Reliability and Similarity Score

The GUI system can use reliability and similarity score for hand gestures, but is more readily illustrated using larger gestures.

Figure 4A:
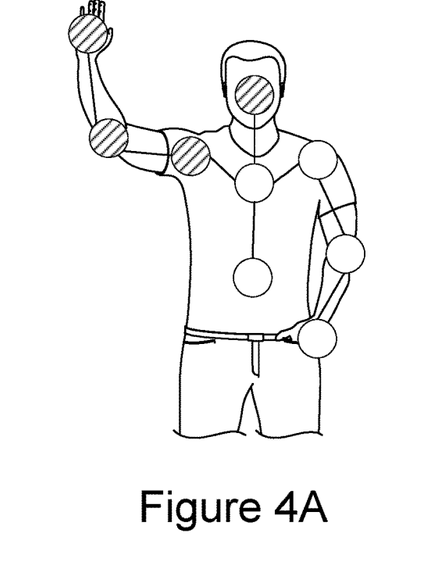
FIGS. 4A-4F illustrate estimation of an example user gesture using detected nodes.
Figure 4B:
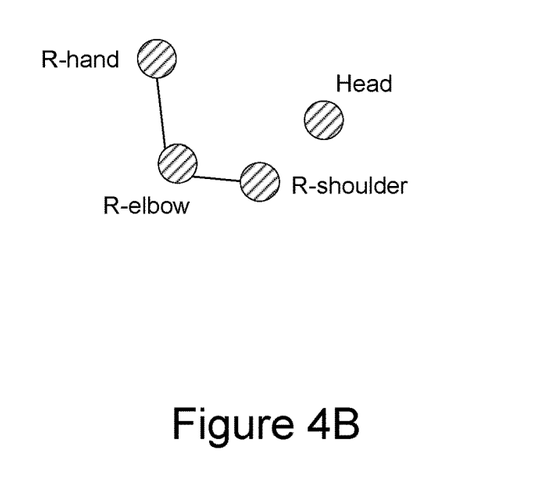

FIG. 4A illustrates an example user gesture overlaid with detected nodes. In the figure, filled nodes (diagonally hatched) are the nodes defined by the gesture, while white nodes are detected without being part of the gesture. FIG. 4B illustrates a node diagram for the gesture, i.e. the relative coordinates of the nodes.

Figure 4C:
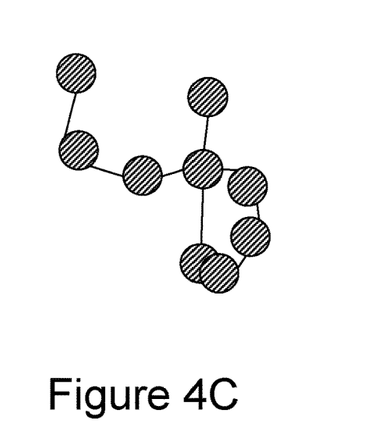

FIG. 4C illustrates sensor data of a detected user gesture. As can be seen, the detected nodes do not exactly match the nodes of the gesture illustrated in FIG. 4B.

Figure 4D:
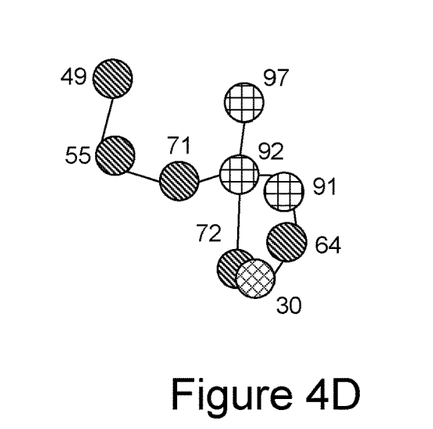

FIG. 4D illustrates the detected nodes and their reliability scores. The scores can be determined using a function that may take as parameters one or more of the following: distance to the user, coordinate noise, ambient lighting level, gesture speed, occultation measure of objects in from of the user, etc.

In FIG. 4D, the nodes are associated with different markings corresponding to the reliability scores: a square pattern indicates reliable (e.g. >85%), diagonal hatching less reliable (e.g. 45-85%) and small circles unreliable (<45%). The individual scores, not necessarily all of them, can be processed to yield an overall score. In an embodiment, one or more of the individual scores can be weighted in the calculation of the overall score. In the example, it is assumed that the overall score indicates that the sensor data is unreliable, for example if the overall score is below a given value, which can depend on context such as lighting conditions, gesture speed, etc.

Figure 4E:
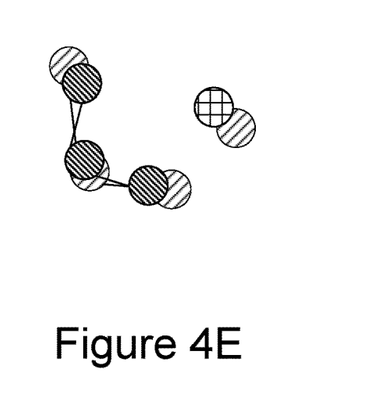

FIG. 4E illustrates comparison between detected nodes and stored gesture nodes. In the example, the nodes in FIG. 4B are compared to the corresponding detected nodes (i.e. a subset of all detected nodes) and a similarity score is determined, e.g. using conventional methods. The function used to determine the similarity score may be different between stored gestures. The similarity scores can then be used to determine a matching GUI gesture.

In one embodiment, if differences of angles and distances between nodes of the sensor data and nodes of parameters are the same (within an margin), this can be interpreted as a match. In case of several matches, the best match can be chosen.

In another embodiment, temporal gesture analysis can contribute to the similarity score. In the example, if the user's arm is raised straight up from down to up, this can increase similarity score.

Figure 4F:
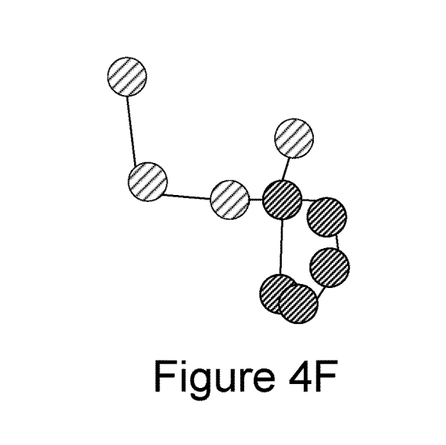

FIG. 4F illustrates how the measured nodes have been combined with the stored parameters to obtain an estimated gesture.

An example experimental GUI system includes a large screen with which a user can interact by 'touching' activated at a distance from the screen and a LeapMotion sensor, for example located in the screen stand. In other words, user hand gestures are interpreted as they approach the screen.

Experiments showed a need to correct hand gestures made when a hand is located high above the sensor, since this brings too much noise to finger coordinates.

In a first implementation of the experimental system, only the tip of the index finger allows to control the GUI. Hand orientation is ignored because interaction is made with the closest pixel or group of pixels located under the fingertip.

In this context, captured coordinates of the top of the index metacarpal have been shown to be much more stable than the coordinates of the tip of the index distal phalange (i.e. the fingertip).

These two spatial nodes can be projected onto the plane of the screen to provide $(x_d, y_d)$, the projected coordinates of the index distal phalange node, and $(x_m, y_m)$, the projected coordinates of the index metacarpal node.

Learning the parameters can then be done by calculating function f that satisfies $(x_d, y_d) = f(x_m, y_m)$. How to do this is well-known.

Once the parameters have been learnt, coordinates of the index metacarpal node and the parameters can be used to estimate the coordinates of the index distal phalange node, since these coordinates practically always are more stable than those of the fingertip.

The experimental GUI system can also manage the distance of the tip of the index finger from the screen to click, drag, scroll and so on. This can be done in generally the same way in the z dimension by finding the function g that satisfies $(z_d) = g(z_m)$.

Once f and g are known (i.e. the learnt parameters have been obtained), the GUI system can use $(x_m, y_m, z_m)$ instead of $(x_d, y_d, z_d)$ all the time, which has been shown to give a better coordinate accuracy over the whole surface of the screen in the experimental system.

It will be appreciated that the present principles can be used in parallel with a conventional remote control, a gesture detection system, or both. For example, the GUI system can be configured to use the present principles when the user is within a certain distance from the display and the gesture detection when the user is further away. The distance can be configured during manufacture or by the user.

It will thus be appreciated that the present principles can be used to provide a GUI system that can provide greater accuracy for detected user gestures.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A device comprising:
   memory configured to store instructions, executable by a processor, and to store parameters; and
   at least one hardware processor configured to execute the instructions to perform steps of a method comprising:
   obtaining, from at least one sensor, sensor data corresponding to a captured user gesture; and
   upon determining that not all the sensor data is reliable:
   determining a stored user interface gesture that matches the sensor data;
   obtaining parameters for the determined stored user interface gesture learnt from a present user, wherein:
   in case no parameters for the determined stored user interface gesture learnt from the present user are obtained, obtaining default parameters for the determined stored user interface gesture;
   in case no default parameters for the determined stored user interface gesture are obtained, using the sensor data in the user interface; and
   enhancing reliable parts of the sensor data with the parameters for the determined stored user interface gesture by replacing unreliable sensor data with data based on the parameters to estimate the user gesture in a user interface.

2. The device of claim 1, wherein the determining the stored user interface gesture that matches the sensor data further comprises:
   determining the stored user interface gesture with a highest similarity score to the sensor data.

3. The device of claim 1, wherein the data based on the parameters is further obtained from reliable sensor data.

4. The device of claim 3, wherein the sensor data comprises node coordinates and relative node coordinates of the user interface gesture and wherein the reliable sensor data comprises reliable coordinates for at least one node and wherein the data based on the parameters is obtained by adding relative node coordinates to the reliable coordinates for the at least one node.

5. The device of claim 1, wherein the estimated user gesture is used in the user interface for at least one of determining interaction with an object in the user interface and rendering of the user gesture in the user interface.

6. The device of claim 1, wherein the at least one hardware processor is configured to determine whether all the sensor data is reliable.

7. The device of claim 1, wherein the at least one hardware processor is further configured to, upon determining that all the sensor data is reliable, estimating the user gesture in the user interface based only on the sensor data.

8. A method implemented in at least one hardware processor of a device, the method comprising:
 obtaining, from at least one sensor, sensor data corresponding to a captured user gesture; and
 upon determining that not all the sensor data is reliable:
 determining a stored user interface gesture that matches the sensor data;
 obtaining parameters for the determined stored user interface gesture learnt from a present user, wherein:
 in case no parameters for the determined stored user interface gesture learnt from the present user are obtained, obtaining default parameters for the determined stored user interface gesture;
 in case no default parameters for the determined stored user interface gesture are obtained, using the sensor data in the user interface; and
 enhancing reliable parts of the sensor data with the parameters for the determined stored user interface gesture by replacing unreliable sensor data with data based on the parameters to estimate the user gesture in a user interface.

9. The method of claim 8, wherein determining the stored user interface gesture that matches the sensor data comprises determining the stored user interface gesture with a highest similarity score to the sensor data.

10. The method of claim 8, further comprising upon determining that all the sensor data is reliable, estimating the user gesture in the user interface based only on the sensor data.

11. A non-transitory computer-readable storage medium storing instructions that, when executed, cause at least one hardware processor to perform a method of claim 8.

* * * * *